E. R. PEARSON.
COIL SEPARATOR.
APPLICATION FILED NOV. 8, 1912.
1,179,030.
Patented Apr. 11, 1916.
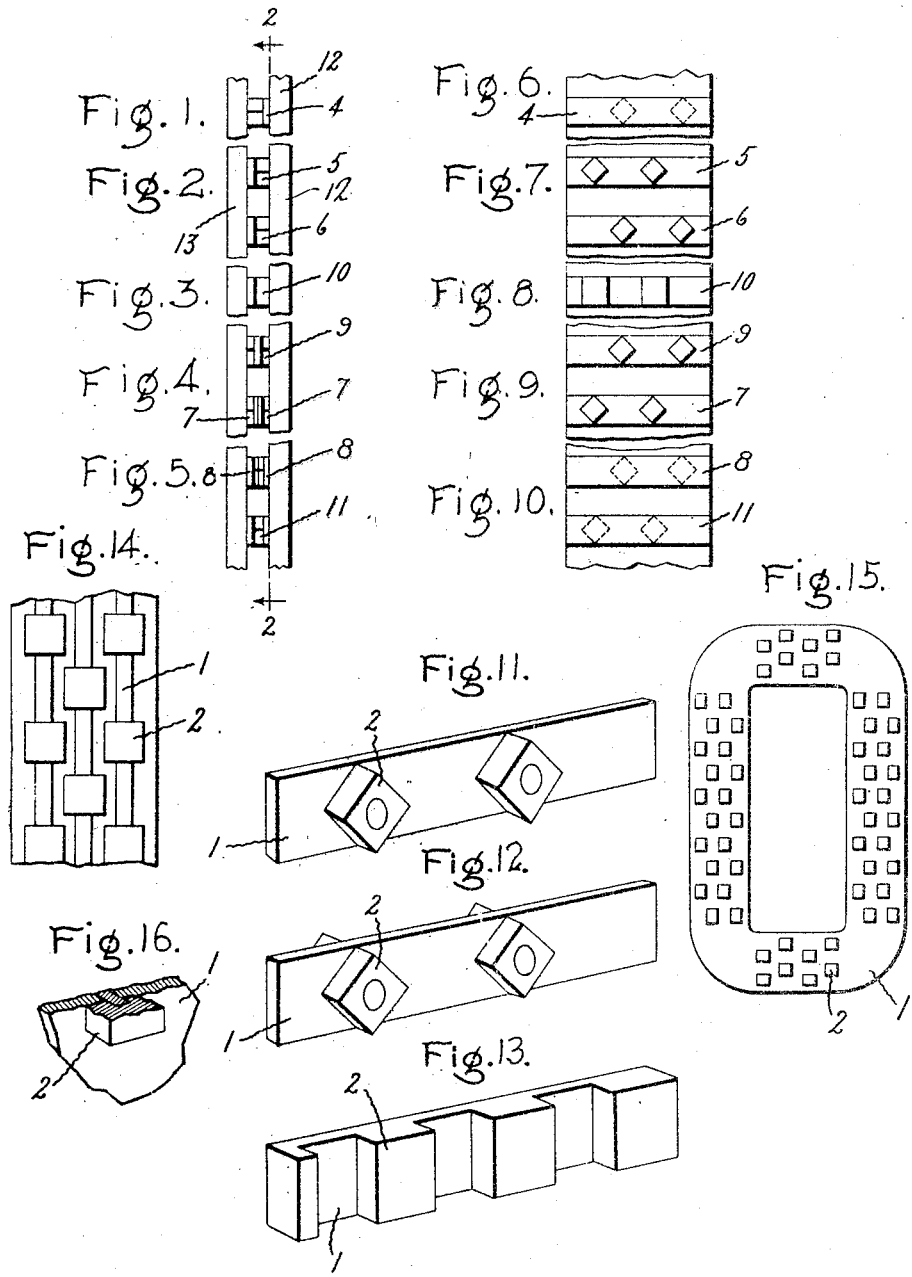

UNITED STATES PATENT OFFICE.

EDWIN R. PEARSON, OF PITTSFIELD, MASSACHUSETTS, ASSIGNOR TO GENERAL ELECTRIC COMPANY, A CORPORATION OF NEW YORK.

COIL-SEPARATOR.

1,179,030.  Specification of Letters Patent.  Patented Apr. 11, 1916.

Application filed November 8, 1912. Serial No. 730,216.

*To all whom it may concern:*

Be it known that I, EDWIN R. PEARSON, a citizen of the United States, residing at Pittsfield, county of Berkshire, State of Massachusetts, have invented certain new and useful Improvements in Coil-Separators, of which the following is a specification.

My invention relates to the supporting of coils of electrical machines and the objects of my invention are the provision of simple supports or separators and suitably locating the same with respect to the coils.

During the electrical operation of electrical machines the coils thereof and the individual turns of the coils are subjected to mechanical strains tending to displace them. It has been common, particularly in transformers, to provide straight or bent rods ("wiggle sticks") in the spaces between adjacent coils extending in the general direction of the turns. In such constructions it is necessary that certain turns of the coils be left wholly unsupported or supported at widely separated points only in order that the flow of the cooling fluid between the coils may not be too much obstructed or the coils too much shielded from contact with the fluid.

By my invention substantially all of the various turns of the coils may be supported without unduly shielding the coils from the cooling fluid or unduly obstructing its flow. I accomplish this desirable result by providing supports or separators each of which consists of a base piece provided with projections on one or both sides, and by suitably positioning such separators with respect to the coils and the turns thereof. The base pieces are primarily useful only for conveniently locating the projections and almost anything which performs this function is satisfactory. The projections are preferably spaced apart substantially equal distances and are either integral with the base pieces or attached thereto. To offer the least obstruction to the flow of the cooling fluid between the coils, the projections may present inclined faces thereto.

According to one modification the base of each separator consists of a comparatively narrow strip of material. In general such separators are located in the spaces between the coils with the base pieces extending substantially transversely to the turns. As a group, the projections are preferably placed unsymmetrically with respect to the length of their respective base pieces, that is, as a group, placed nearer one end of each base piece than the other. When such separators are used each is preferably reversed end for end with respect to that next preceding. This brings each projection opposite a space between two projections of the preceding separator which tends to produce an intermixing of the streams of cooling fluid and a general equality of temperature, and affords equal support to substantially all the turns. The supports may of course be reversed by groups, instead of being reversed individually should this seem desirable in any case; the individual reversing will generally be found preferable. The separators may, however, be located with the bases extending parallel to the turns. According to another modification the base piece may be of considerable area, carrying a considerable number of projections and extending over a great part or even the whole of the surface of a coil. This possesses certain advantages set out in detail later.

Figures 1–5 are elevations showing the edges of parts of adjacent pancake coils with various possible arrangements of various forms of my spacer or separator between them. Figs. 6–10 are elevations showing sides of a part of the coils of Figs. 1–5 and the separators applied thereto. Figs. 11–15 illustrate possible forms of the separator. Fig. 16 illustrates a detail of a means for attaching the projections to the bases.

Each separator or support is composed in general of a base piece 1 and projections 2 thereon. These projections may be made integral with the base piece as shown in Fig. 13 or may be made separate therefrom and attached thereto by rivets, as shown in Figs. 11, 12 and 16 or cemented on. The supports and the rivets, if any are used, will preferably be made from insulating material, as for example, from pressboard.

The projections may be located on only one side of the base as shown in Figs. 11 and 13, or on both sides as shown in Fig. 12. The projections are preferably spaced equal distances apart, and as a group are set unsymmetrically to the length of the base where the small base is used, that is, as a group are set nearer one end of the base than the other. This unsymmetrical setting of the projections is clearly shown in Figs. 11, 12 and 13.

The separators with narrow bases may be arranged in various ways with respect to themselves and to the coils. Figs. 1—10 illustrate a number of preferred arrangements. Thus in these figures the separators 4, 5, 6, 7 and 8 are similar in form to that shown in Fig. 11; the separator 9 to that shown in Fig. 12; 10 to that in Fig. 13; and the separator 11 to that of Fig. 11 except that two base pieces are provided, the projections being located between the two base pieces. Separators 4 and 5 are so located that the base of the separator 4 rests against, and transversely to the turns of, the coil 12 and the base of the separator 5 against, and transversely to the turns of, the coil 13. This arrangement is particularly adapted for coils having a plurality of layers of turns. The separators 6 and 10 are located similarly to separator 5 in respect to their base pieces and the coils. The projections of these separators rest against the opposite coil 12. As will be apparent from Figs. 7, 9 and 10, the successive separators are reversed relatively end for end; by reason of this reversal and the unsymmetrical setting of the projections with respect to the bases, each projection of each separator is opposite a space between two projections of the preceding and succeeding separators or a space at the ends of the bases thereof. The cooling fluid flowing upwardly between the coils passes about the projections and the streams thereof tend to intermix; the fluid is in intimate contact with the coils, except where the coils are covered by the bases or the projections; in practice this is a small proportion of the total area. In order that the least obstruction may be offered to the flowing cooling fluid, the rectangular projections may be so placed that the sides thereof are angularly related to the edges of the base pieces as shown at 4, 5 and 6.

When separators are used employing a single base and projections on both sides of the same they may be located as shown at 9, that is, both coils are engaged by the projections. Less of the entire surface of both coils is thus shielded from the cooling fluid while in general the turns are engaged at a sufficiently great number of points to sufficiently support them. Separators similar to that of Fig. 11 may be employed to secure the same result by using two separators together, placing their bases against each other as shown at 7 in Fig. 4. The same separators may be so arranged that the bases engage both coils, the projections on the two supports engaging each other as shown at 8; this offers the maximum support to the various turns, but likewise shields a maximum part of the coils from the cooling fluid.

At 11 is shown a single separator comprising two bases and one set of projections between them; when located between two coils its effect is similar to the effect of the separators 8, except that a somewhat more solid construction is obtained.

Generally the use of separators similar to that of Fig. 11 arranged with reference to the coils as shown at 4 and 5, or 5 and 6 is preferable. Where each pancake coil is itself made up of two or more layers of turns, the first arrangement, that of 4 and 5, is preferable, since each outside layer is supported to the same extent as every other outside layer. When each pancake coil is made up of but one layer of turns, it is immaterial whether the arrangement of 4 and 5 or 5 and 6 be used; the arrangement of 5 and 6, however, provides for the most equitable distribution of the heat in the coils. The narrow based separators may be made of substantially the same length as the coils and located with the base pieces substantially parallel to the turns; such a construction requires a smaller number of separators and less labor and at times less trouble in the positioning of the required number of projections. See Fig. 14. Adjacent projections are as before preferably offset from each other and by locating the base pieces sufficiently closely together every turn may be engaged by the projections.

According to another modification a number of rows of projections may be located on a single base piece. The limit to which this modification may most conveniently go is the use of a single base piece between each two coils, this single base piece carrying all the projections between these coils. See Fig. 15. This base piece may then be, or supplant, the insulating collar often placed between two adjacent coils. In order that the insulating strength of the collar may not be weakened the projections may be cemented to the collar or base. They may be attached by rivets without appreciably weakening the collar if the rivets pass only partly through the projections as shown in Fig. 16.

Other modifications of my invention will readily be suggested by the preceding description of certain preferred ones.

What I claim as new and desire to secure by Letters Patent of the United States, is:—

1. A separator for coils of electrical machines consisting of a base piece provided with projections rectangular in shape having flat coil engaging faces substantially parallel to the extent of the base piece, the projections being so placed that the sides thereof are angularly related to the edges of the base piece.

2. In an electrical machine, the combination with a coil thereof, of supports for the coil each comprising a base piece provided with projections, the projections as a group being unsymmetrically placed with respect to the ends of the respective base pieces, the base pieces extending transversely of the turns of the coil and some of the supports being reversed end for end with respect to those preceding.

3. In an electrical machine including coils and provided with ventilating spaces between the coils, supports for the coils including projections located therebetween, the projections being generally offset with respect to those preceding and succeeding and each projection extending substantially to a line extending in the direction of the turns of one of the coils and through the edge of another projection offset therefrom.

4. In an electrical machine including coils and provided with ventilating spaces adapted to permit the flow of a fluid between the coils, supports for the coils including projections located therebetween, the projections presenting inclined faces to the flow of the fluid and each projection extending substantially to a line extending in the direction of the turns of one of the coils and through the edge of another projection offset therefrom.

5. In an electrical machine, the combination with coils thereof provided with ventilating spaces between the coils, of supports for the coils including projections located between the coils and means for carrying the projections, the projections being generally offset with respect to those preceding and succeeding and each projection extending substantially to a line extending in the direction of the turns of one of the coils and through the edge of another projection offset therefrom.

6. In an electrical machine, the combination with coils thereof provided with ventilating spaces adapted to permit the flow of a fluid between the coils, of supports for the coils including projections located therebetween and means for carrying the projections, the projections presenting inclined faces to the flow of the fluid and each projection extending substantially to a line extending in the direction of the turns of one of the coils and through the edge of another projection offset therefrom.

7. In an electrical machine, the combination with a coil thereof, of means for supporting a portion of a face of said coil including a plurality of projections uniformly distributed over and engaging said portion of the face of a coil and means for carrying the projections, the projections being generally offset with respect to those preceding and succeeding and each projection extending substantially to a line extending in the direction of the turns of one of the coils and through the edge of another projection offset therefrom.

In witness whereof, I have hereunto set my hand this seventh day of November, 1912

EDWIN R. PEARSON.

Witnesses:
HELEN ORFORD,
BENJAMIN B. HULL.